3,449,354
2-[(2-TRIFLUOROMETHYLPHENOXY)METHYL]-
2-IMIDAZOLINE
Halbert C. White, Midland, Mich., assignor to The Dow
Chemical Company, Midland, Mich., a corporation of
Delaware
No Drawing. Filed Apr. 4, 1967, Ser. No. 628,265
Int. Cl. C07d 49/34; A61k 27/00
U.S. Cl. 260—309.6                    4 Claims

ABSTRACT OF THE DISCLOSURE

The new compound 2-[(2-trifluoromethylphenoxy)-methyl]-2-imidazoline, and its pharmaceutically-acceptable salts such as the hydrochloride. The compound and its salts are active as antidepressants.

---

This invention is concerned with haloaryloxy-imidazoline and the pharmaceutically-acceptable salts thereof.

The novel imidazoline is a crystalline solid which is of varying degrees of solubility in organic solvents such as 1,2-dichlorobenzene, methylene chloride and alcohols and only slightly soluble in water. The pharmaceutically-acceptable salts of the novel compound are soluble in water and slightly soluble in organic solvents such as acetone, benzene and alcohols.

The novel compound is useful for administration to laboratory animals in studying the behavior thereof and in studying drug effects on the central and peripheral nervous system, and is particularly useful as an antidepressant. The compound has little or no pharmacological activity in other areas at dosages consistent with good antidepressant activity. The compound is preferably employed as its hydrochloride salt. Other pharmaceutically-acceptable salts, and particularly the p-toluenesulfonate, are useful in preparing 2-[(2-trifluoromethylphenoxy)-methyl]-2-imidazoline.

The term "pharmaceutically-acceptable salt" as herein employed refers to salts of the imidazoline compound which are substantially non-toxic at dosage levels consistent with good antidepressant activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or critic acid or with organic sulfonic acids such as methanesulfonic or p-toluenesulfonic acid.

2-[(2-trifluoromethylphenoxy)methyl]-2 - imidazoline is prepared by the reaction of 2-trifluoromethylphenoxy-acetonitrile with ethylenediamine p-toluenesulfonate to form 2-[(2-trifluoromethylphenoxy)methyl]-2-imidazoline p-toluenesulfonate, and the subsequent hydrolysis of the salt in aqueous base to liberate the compound as a free base. The 2-trifluoromethylphenoxyacetonitrile can be prepared by known procedures, for example, by mixing 2-trifluoromethylphenol and chloroacetonitrile with potassium carbonate in an inert organic solvent.

The reaction proceeds with the evolution of ammonia when the 2-trifluoromethylphenoxyacetonitrile and the ethylenediamine p-toluenesulfonate are mixed together, preferably in an inert organic solvent as a reaction medium. Representative and suitable inert organic solvents which can be employed as reaction media include alkyl-benzenes, xylenes and halobenzenes, preferably 1,2-dichlorobenzene. The reaction is preferably carried out under an inert atmosphere. The reaction proceeds readily at temperatures from about 150° to about 180° C. and is preferably carried out under reflux at the boiling temperature of the reaction mixture. The product precipitates in the reaction mixture as its p-toluenesulfonate salt, and the salt can be separated by conventional methods as filtration, centrifugation or decantation. The 2-[(2-tri-fluoromethylphenoxy)methyl]-2-imidazoline p - toluene-sulfonate can be purified by conventional procedures such as recrystallization and washing. The free base can be obtained by hydrolysis of the salt in aqueous base. The free base is then separated by extraction with an organic solvent such as methylene chloride or chloroform, followed by evaporation of the solvent.

The product can be purified by conventional methods such as recrystallization, or it can be converted to a pharmaceutically-acceptable salt.

The pharmaceutically-acceptable salts of 2[(2-trifluoromethylphenoxy)methyl]-2-imidazoline can be prepared by conventional procedures such as dissolving the free base in a minimal amount of alcohol and adding an alcohol solution of an acid such as hydrochloric acid, hydrobromic acid, malic acid, maleic acid or succinic acid until precipitaton of the correspondng salt is complete. The salt can further be purified by recrystallization or converted to the free base by hydrolysis.

The free base can be liberated by hydrolysis of a pharmaceutically-acceptable salt in aqueous base. The salt is mixed with at least a molar equivalent of sodium hydroxide in aqueous solution, after which the free base can be separated by extraction with a chlorinated hydrocarbon solvent. The solvent can be removed by conventional methods such as evaporation or distillation and the free base can be purified by methods such as recrystallization.

In preparing the compound of the invention, 2-trifluoromethylphenoxyacetonitrile, ethylenediamine p-toluenesulfonate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. In a convenient procedure, nitrogen is passed through the mixture to carry off ammonia of reaction while the mixture is heated at a temperature within the reaction temperature range for about 1 to 10 hours. The reaction vessel is vented to a trap containing aqueous hydrochloric acid to react with the ammonia of reaction. The reaction mixture is then cooled and filtered. The 2-[(2-trifluoromethylphenoxy)methyl]-2-imidazoline p-toluenesulfonate filter cake can be further purified by recrystallization or it can be converted to the free base by hydrolysis in aqueous base.

In a representative operation, 2-trifluoromethylphe-noxyacetonitrile (16.1 grams; 0.08 mole) was mixed with ethylenediamine p-toluenesulfonate (18.8 grams; 0.08 mole) and 60 milliliters of 1,2-dichlorobenzene. Nitrogen was passed through the mixture while the mixture was heated at a temperature of 180° C. for 30 minutes. The ammonia of reaction was collected by passing the exit gases through a gas scrubber containing dilute aqueous hydrochloric acid. The reaction mixture was cooled and filtered to obtain 2-[(2-trifluoromethylphenoxy)-methyl]-2-imidazoline p-toluenesulfonate, having a molecular weight of 416.3, as a filter cake. The filter cake was mixed with water and about 20 milliliters of aqueous 5 normal sodium hydroxide was added. The mixture was extracted with methylene chloride and the extract was evaporated in vacuo to leave 2-[(2-trifluoromethylphe-noxy)methyl]-2-imidazoline, having a molecular weight of 244.1, as a residue. The 2-[(2-trifluoromethylphe-noxy)methyl]-2-imidazoline was dissolved in about 100 milliliters of isopropyl alcohol. The alcohol solution was acidified by the addition of hydrochloric acid in isopropyl alcohol until precipitation was complete. The mixture was filtered and the 2-[(2-trifluoromethylphenoxy)methyl]-2-imidazoline hydrochloride product was collected as a filter cake and found to melt at 220°–221° C. The product was found to have a chloride equivalent weight of 280 as compared with the equivalent weight of 280.5, calculated for the named structure. The structure of the product was confirmed by nuclear magnetic resonance spectroscopy.

In substantially the same procedure described above employing similar inert organic solvents and substituting for the hydrochloric acid an acid capable of forming a pharmaceutically-acceptable acid addition salt, the following halophenoxymethylimidazoline salts are formed.

2-[(2-trifluoromethylphenoxy)methyl] - 2 - imidazoline hydrobromide, having a molecular weight of 325, is prepared by substituting hydrobromic acid for hydrochloric acid in the procedure described above.

2-[(2-trifluoromethylphenoxy)methyl] - 2 - imidazoline sulfate, having a molecular weight of 342.2, is prepared by substituting sulfuric acid in lieu of the hydrochloric acid in the procedure described above.

2-[(2-trifluoromethylphenoxy)methyl] - 2 - imidazoline succinate, having a molecular weight of 362.2, is prepared by substituting succinic acid in lieu of the hydrochloric acid in the procedure described above.

Antidepressant activity of the new compound was indicated by reversal of reserpine-induced depression in mice. In representative operations, 2-[(2-trifluoromethylphenoxy)methyl]-2-imidazoline hydrochloride was administered to a group of mice at a dosage rate of 25 milligrams per kilogram by intraperitoneal injection. One hour after such dose of the imidazoline compound, reserpine was administered to each mouse at a dosage rate of 5 milligrams per kilogram by intraperitoneal injection. The administration of 5 milligrams per kilogram of reserpine intraperitoneally to mice results in a progression of signs starting with drooping of the eyelids (ptosis) and pilo-erection and culminating in a generalized depression with decreased spontaneous motor activity and decreased responsiveness to auditory or tactile stimuli.

Following the administration of the reserpine, the test animals were observed for the above signs of depression. All of the mice administered 2-[(2-trifluoromethylphenoxy)methyl]-2-imidazoline hydrochloride were observed to exhibit increased spontaneous motor activity and increased responsiveness to stimuli, indicating a reversal of reserpine depression.

In other operations, the dosage of 2-[(2-trifluoromethylphenoxy)methyl]-2-imidazoline hydrochloride effective to reverse the antagonism of the anticonvulsant effect of diphenylhydantoin by reserpine in 50 percent of the mice tested ($ED_{50}$) was found to be 6.8 milligrams per kilogram.

I claim:

1. A member of the group consisting of 2-[(2-trifluoromethylphenoxy)methyl]-2-imidazoline and the pharmaceutically-acceptable salts thereof.

2. The compound of claim 1 wherein the compound is 2-[(2-trifluoromethylphenoxy)methyl]-2-imidazoline.

3. The compound of claim 1 wherein the compound is 2-[(2-trifluoromethylphenoxy)methyl]-2-imidazoline hydrochloride.

4. The compound of claim 1 wherein the compound is 2-[(2-trifluoromethylphenoxy)methyl] - 2 - imidazoline p-toluenesulfonate.

References Cited

FOREIGN PATENTS

| | | |
|---|---|---|
| 199,906 | 12/1938 | Switzerland. |
| 204,726 | 8/1939 | Switzerland. |
| 204,742 | 8/1939 | Switzerland. |

OTHER REFERENCES

Van der Stelt et al.: Arzneim.-Forsch, vol. 15, pp. 1251–2 (1965).

HENRY R. JILES, *Primary Examiner.*

N. TROUSOF, *Assistant Examiner.*

U.S. Cl. X.R.

260—465, 999